United States Patent
Adamic, Jr.

(10) Patent No.: US 9,732,246 B2
(45) Date of Patent: Aug. 15, 2017

(54) NON-NEWTONIAN INKJET INKS

(71) Applicant: Hewlett-Packard Development Company, L.P., Fort Collins, CO (US)

(72) Inventor: Raymond Adamic, Jr., Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/119,063

(22) PCT Filed: Mar. 6, 2014

(86) PCT No.: PCT/US2014/021066
§ 371 (c)(1),
(2) Date: Aug. 15, 2016

(87) PCT Pub. No.: WO2015/134020
PCT Pub. Date: Sep. 11, 2015

(65) Prior Publication Data
US 2017/0051172 A1    Feb. 23, 2017

(51) Int. Cl.
| | |
|---|---|
| C09D 11/38 | (2014.01) |
| C09D 11/34 | (2014.01) |
| B41J 2/01 | (2006.01) |
| C09D 11/033 | (2014.01) |
| C09D 11/324 | (2014.01) |

(52) U.S. Cl.
CPC ............ *C09D 11/38* (2013.01); *B41J 2/01* (2013.01); *C09D 11/033* (2013.01); *C09D 11/324* (2013.01); *C09D 11/34* (2013.01)

(58) Field of Classification Search
None
See application file for complete search history.

(56) References Cited

U.S. PATENT DOCUMENTS

| | | |
|---|---|---|
| 4,591,612 A | 5/1986 | Quinn |
| 5,663,217 A | 9/1997 | Kruse |
| 6,663,704 B2 | 12/2003 | Spencer et al. |
| (Continued) | | |

FOREIGN PATENT DOCUMENTS

WO    2014127050    8/2014

OTHER PUBLICATIONS

International Search Report dated Dec. 3, 2014 for PCT/US2014/021066, Applicant Hewlett-Packard Development Company, L.P.
(Continued)

*Primary Examiner* — Lisa M Solomon
(74) *Attorney, Agent, or Firm* — HP Inc. Patent Department (57) ABSTRACT

The present disclosure provides non-Newtonian inkjet inks and related methods. In one example, a non-Newtonian inkjet ink can comprise a gelator in an amount ranging from 0.1% to 10% by weight based on the total weight of the non-Newtonian inkjet ink; a salt in an amount of 0.05% to 20% by weight based on the total weight of the non-Newtonian inkjet ink; a sugar alcohol in an amount of 1% to 25% by weight based on the total weight of the non-Newtonian inkjet ink; and an organic solvent. The gelator and the salt can form a structured network, where the inkjet ink has a first dynamic viscosity ranging from 25 cps to 10,000 cps at a first state and a second dynamic viscosity ranging from 1 cps to 50 cps at a second state.

15 Claims, 3 Drawing Sheets

(56) References Cited

U.S. PATENT DOCUMENTS

| | | |
|---|---|---|
| 6,905,539 B2 | 6/2005 | Patel et al. |
| 7,320,727 B2 | 1/2008 | Jou et al. |
| 7,563,314 B2 | 7/2009 | Breton et al. |
| 8,435,339 B2 | 5/2013 | Koyano et al. |
| 2006/0266259 A1 | 11/2006 | Bedford et al. |
| 2007/0211110 A1 | 9/2007 | Iftime et al. |
| 2007/0279467 A1 | 12/2007 | Regan et al. |
| 2009/0253853 A1 | 10/2009 | Lin et al. |
| 2012/0028002 A1 | 2/2012 | Yokoi et al. |
| 2012/0222583 A1 | 9/2012 | Yang et al. |
| 2013/0053495 A1 | 2/2013 | Okuda et al. |
| 2013/0141505 A1 | 6/2013 | Ikeda et al. |

OTHER PUBLICATIONS

Extended European Search Report dated Jan. 23, 2017 for PCT/US2014/021066, Applicant Hewlett-Packard Development Company, L.

*FIG. 5*

NON-NEWTONIAN INKJET INKS

BACKGROUND

The use of ink-jet printing systems has grown dramatically in recent years. This growth may be attributed to substantial improvements in print resolution and overall print quality. Today's ink-jet printers offer acceptable print quality for many commercial, business, and household applications at costs much lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in ink-jet recording are commonly composed of water-soluble organic solvents (humectants, etc.), surfactants, and colorants in a predominantly aqueous fluid. When a recording is made on plain paper, the deposited colorants retain some mobility, which can be manifest in poor bleed, edge acuity, feathering, and inferior optical density/chroma (due to penetration on the paper). These features adversely impact text and image quality. Other systems include using a coated paper or coating the paper immediately before printing with the inkjet ink. The coatings generally contain various components such as fixers to reduce colorant mobility. However, such systems can be costly, can lower print quality, and can be limiting as the media is typically matched to the inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Reference will now be made to the exemplary embodiments illustrated, and specific language will be used herein to describe the same. It will nevertheless be understood that no limitation of the scope of the disclosure is thereby intended.

DETAILED DESCRIPTION

Non-Newtonian inkjet inks can be prepared where the viscosity of the inks can be manipulated by physical or thermal forces allowing for printing of the inks via inkjet technologies at desirable viscosities. Notably, the reformation of a structured network after printing can allow for the present non-Newtonian inkjet inks to provide better optical density and other properties than achieved by traditional Newtonian inkjet inks. Additionally, in accordance with the present technology, the non-Newtonian inkjet inks of the present disclosure include a sugar alcohol that provides curl and rub/scratch resistance not achieved by many traditional inks including gel-based inks.

Examples in accordance with the disclosure are directed to non-Newtonian inkjet inks that are useful in standard inkjet printing systems. The present non-Newtonian inkjet inks can be inkjet printed as the viscosity of the non-Newtonian inkjet inks are lowered using thermal control or mechanical control within a printing system, e.g., an inkjet printhead. Once exiting the printhead, the viscosity of the present non-Newtonian inkjet inks rapidly increases (e.g. within 30 seconds) via self-assembly of a structured network within the non-Newtonian inkjet inks. Generally, the structured network can be assembled between a gelator, e.g., a low molecular weight organic gelator or metal oxide, and a salt within the non-Newtonian inkjet inks disclosed herein.

It is noted that when discussing the present compositions and methods, each of these discussions can be considered applicable to each of these embodiments, whether or not they are explicitly discussed in the context of that embodiment. Thus, for example, in discussing a low molecular weight organic gelator used in a non-Newtonian inkjet ink, such a low molecular weight organic gelator can also be used in a method of manufacturing a non-Newtonian inkjet ink and/or a method of printing a non-Newtonian inkjet ink, and vice versa.

It is also noted that when referring to an "ink" or an "inkjet ink," this does not infer that a colorant necessarily be present. Inks, as defined herein, can be colorant free or can alternatively include colorant.

Generally, recording media and/or inkjet inks can have a variety of additives and coatings to provide acceptable quality when used in printing applications. However, utilizing the present non-Newtonian inkjet inks can eliminate the use of some layers, can eliminate costly additives, and/or can eliminate the amounts of materials used in the media sheets and/or inks.

With the above in mind, a non-Newtonian inkjet ink can comprise a gelator in an amount ranging from 0.1% to 10% by weight based on the total weight of the non-Newtonian inkjet ink; a salt in an amount of 0.1% to 20% by weight based on the total weight of the non-Newtonian inkjet ink; a sugar alcohol in an amount of 1% to 25% by weight based on the total weight of the non-Newtonian inkjet ink; and an organic solvent. Water can optionally be present, and in some examples, the ink can be an aqueous ink. Once printed, the gelator and the salt can form a structured network. Further, the inkjet ink generally has a first dynamic viscosity ranging from 25 cps to 10,000 cps at a first state and a second dynamic viscosity ranging from 1 cps to 50 cps at a second state. The first dynamic viscosity is generally higher than the second dynamic viscosity. It is noted that for all viscosity measurements herein, unless otherwise stated, 25° C. is the temperature that is used.

Regarding the present states, such states generally refer to the non-Newtonian inkjet ink at a first state, e.g. proximate in time when at rest (subject to shear rate of $5\ s^{-1}$) or at room temperature (23° C.), and at a second state, e.g. proximate in time to when at high shear ($10,000\ s^{-1}$) or at elevated temperature (50° C.). As such, the present non-Newtonian inkjet inks can be subject to thinning under shear and/or heat to reduce the viscosity and allow for the inks to be processed in an inkjet printing apparatus. In one example, the viscosity of the first state can be higher than 10,000 cps, such as at least 20,000 cps, at least 100,000 cps, or even at least 500,000 cps. Thus, shearing and/or heating can alter, e.g. lower, the viscosity profiles of the present inks.

As used herein, "structured network" refers to the three dimensional structure formed by a gelator (e.g., a low molecular weight organic gelator or metal oxide) and dissolved salt via electrostatic interactions and/or physical interactions in the non-Newtonian inkjet ink. In one example, the three dimensional structure can be dependent upon mechanical and/or thermal forces. Such mechanical and/or thermal forces, such as shear energy or heat energy, weaken the structured network such that the viscosity changes based on the amount of force applied, as discussed herein. In one example, the structured network can be free of polymers in that the three dimensional structure does not comprise polymers. However, such an example does not preclude polymers to be present within the non-Newtonian inkjet ink, or even trapped or contained within the structured network. For example, the present non-Newtonian inkjet inks can further comprise a polymeric surfactant that does not self-assemble as part of the three dimensional structure, but can be present or become trapped within such a structure. In one specific example, the structured network can be a gel.

Regarding the present description as it relates to "non-Newtonian," a non-Newtonian fluid is one in which the viscosity changes as the applied force changes in magnitude, e.g. thermal or mechanical shear, resulting in a viscosity which may not be well-defined. As such, in one aspect, the present non-Newtonian fluids can be thinned by increasing the temperature of the fluids. In another aspect, the present non-Newtonian fluids can be thinned by shearing the fluids. Typically, in inkjet printing applications, ink is moved between a fluid container and the printhead of an inkjet device. In these applications, the present non-Newtonian inkjet inks can be heated at the fluid container, between the fluid container and the printhead, or in the printhead, thereby decreasing viscosity allowing for inkjet printing followed by rapid cooling and structured network reformation on a recording medium. Additionally, in another example, such inks can be sheared in the printhead thereby decreasing the viscosity allowing for inkjet printing followed by structured network reformation on the recording medium.

In an aspect of these non-Newtonian inkjet inks that may not be intuitive to some, the colorants, e.g. dispersed pigments which may even be large and dense pigments, show little or no settling in the fluid container or printhead during the times when the ink is not moving through the system or when the ink is not heated. When little or no dynamic pressure is being applied to the ink to move it through the system or when no heat is being applied to the ink, the ink has a viscous consistency. However, when the normal amount of dynamic pressure (at least about 10,000 Pascals) is applied to the ink to move it through the inkjet system or when the ink is heated to 50° C., the ink's viscosity may even change to something more resembling classical Newtonian ink jet inks, e.g. from 1 to 5 cps.

Thus, when such inks are ejected at a high frequency from the fluid container of an inkjet fluid dispensing device, the dynamic viscosities of the inks are at a low level that does not interfere with the ejection process of the inkjet system. Generally, during the time when the ink is not moving or being heated, settling may also be completely prevented or slowed down by several orders of magnitude, for example.

In one example, the ink and resultant structured network can comprise a low molecular weight organic gelator. As used herein, "low molecular weight organic gelator" refers to an organic molecule or oligomer that is able to form a three dimensional structure with a salt in the presence of an organic solvent and/or water to form a structured network.

As used herein "oligomer" refers to a compound comprised of no more than 10 monomer units. Regarding low molecular weight, in one example, the present low molecular weight organic gelators can have a weight average molecular weight of 50 to 10,000 Mw. For oligomers, the present molecular weights refer to weight average molecular weights. In one aspect, the weight average molecular weight can be from 100 to 2,000 Mw.

The present low molecular weight organic gelators can include amino acids. Such amino acids can be included as part of peptides and cyclic peptides. In one example, the amino acids can have a protecting group, e.g., an amine protecting group. In another example, the amino acid can be an aliphatic amino acid such as glycine, alanine, valine, leucine, or isoleucine. In another example, the amino acid can be a hydroxyl or sulfur/selenium-containing amino acid such as serine, cysteine, selenocysteine, threonine, or methionine. In still another example, the amino acid can be a cyclic amino acid such as proline or a cyclic peptide. In yet another example, the amino acid can be an aromatic amino acid such as phenylalanine, tyrosine, or tryptophan. In still another example, the amino acid can be a basic amino acid such as histidine, lysine, or arginine. In still yet another example, the amino acid can be an acidic amino acid or amide-containing amino acid such as aspartate, glutamate, asparagine, or glutamine. Such amino acids can be individually functionalized with the presently disclosed protecting groups or can be combined into peptides, including cyclic peptides, with such functionalization. Regarding the amine protecting groups, in one example, the amine protecting group can be a fluorenyl methoxy carbonyl group. In another example, the amine protecting group can be an aromatic protecting group. Other derivatives can include naphthalene or naphthyl based peptides. In one specific example, the low molecular weight organic gelator can be N-(9-fluorenyl-methoxycarbonyl)-L-phenylalanine. In another example, the low molecular weight organic gelator can be a dipeptide of N-(9-fluorenylmethoxycarbonyl)-L-phenylalanine. Other examples include naphthalene derivatives of N-(9-fluorenylmethoxycarbonyl)-L-phenylalanine. Fluorenylmethoxycarbonyl peptide derivative materials can be obtained from BaChem Chemicals Co.

As discussed herein, the low molecular weight organic gelator can generally be present in the non-Newtonian inkjet ink in an amount ranging from 0.1% to 10% by weight based on the total weight of the non-Newtonian inkjet ink. In one example, the low molecular weight organic gelator can be present in an amount of 1% to 5% by weight, and in one aspect, 0.5% to 2% by weight; based on the total weight of the non-Newtonian inkjet ink.

Without intending to be bound by any particular theory, particularly with respect to low molecular weight organic gelators, a gel structure can be formed by pi-pi stacking of aromatic groups present in the low molecular weight organic gelators and hydrogen bonding. The salt can shield the repulsive electrostatic charge between charged low molecular weight organic gelator species and allow them to interact. Such interaction can result in cylindrical fiber formation, and in some examples, the fibers can entangle and swell via water and/or solvent and create a gel structure. The salts can also act to strengthen the fibers or structured network primarily on the recording media. Thus, some treated papers, e.g. ColorLok® papers, which include additional calcium ions, can interact with fibers that form using the low molecular weight organic gelator. Upon heating, the fibers can separate forming discrete domains, thereby minimizing interactions between fibers and decreasing viscosity. After sufficient heating, the fibers can be reduced to monomer units of the low molecular weight organic gelators. In the "monomer" form, the viscosity can be expected to be quite low because the size of the structure is much smaller.

In another example, the ink and resultant structured network can comprise a metal oxide as the gelator. As used herein, "metal oxide" refers to a molecule comprising at least one metal or semi-metal (e.g. Si) atom and at least one oxygen atom which in a particulate form is able to form a three dimensional structure in the presence of salt dissolved in an organic solvent and/or water, thereby forming a structured network. As used herein "semi-metal" includes boron, silicon, germanium, arsenic, antimony, and tellurium, for example. In one example, the metal oxide can include with limitation aluminum oxide, silicon dioxide, zinc oxide, iron oxide, titanium dioxide, indium oxide, zirconium oxide, or mixtures thereof. As discussed herein, the metal oxide (again which is defined to include both metal and semi-metal oxides) can generally be present in the non-Newtonian inkjet ink in an amount ranging from 0.1% to 10% by weight based on the total weight of the non-Newtonian inkjet ink. In one example, the metal oxide can be present in an amount at from 1% to 5% by weight, and in one aspect, at from 0.5% to 2% by weight, based on the total weight of the non-Newtonian inkjet ink. Additionally, the particle size of the metal oxide can be varied depending on the desired properties of the non-Newtonian inkjet ink. For example, the bigger the particle size, the less viscous the non-Newtonian inkjet ink tends to be. In one example, the particle size can be from 5 nm to 50 nm. In another aspect, the particle size can be from 10 nm to 25 nm.

Metal oxide particles, e.g. $Fe_3O_4$, can be dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains, phosphate group or carboxylic group. In some examples, the dispersant used to disperse metal oxide particles can be a polyether alkoxysilane or polyether phosphate dispersant.

Examples of polyether alkoxysilane dispersants used to dispersed metal oxide particles can be represented by the following general Formula (I):

(I)

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—); and c) $R^4$ is hydrogen, or a linear or a branched alkyl group. In some examples, $R^4$ is an alkyl group having from 1 to 5 carbon atoms.

Other examples of dispersants used to disperse metal oxide particles can include polyether alkoxysilane dispersants having the following general Formula (II):

(II)

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the metal oxide particles present in the ink composition are dispersed with polyether alkoxysilanes. Examples of suitable polyether alkoxysilanes include $(CH_3O)_3Si—(CH_2CH_2O)_{n'}$—H; $(CH_3CH_2O)_3Si—(CH_2CH_2O)_{n'}$—H; $(CH_3O)_3Si—(CH_2CH_2O)_{n'}$—$CH_3$; $(CH_3CH_2O)_3Si—(CH_2CH_2O)_{n'}$—$CH_3$; $(CH_3O)_3Si—(CH_2CH_2O)_{n'}$—$CH_2CH_3$; $(CH_3CH_2O)_3Si—(CH_2CH_2O)_{n'}$—$CH_2CH_3$; $(CH_3O)_3Si—(CH_2CH(CH_3)O)_{n'}$—$CH_3$; $(CH_3CH_2O)_3Si—(CH_2CH(CH_3)O)_{n'}$—H; $(CH_3O)_3Si—(CH_2CH(CH_3)O)_{n'}$—$CH_3$; $(CH_3CH_2O)_3Si—(CH_2CH(CH_3)O)_{n'}$—$CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest®A-1230 manufactured by Momentive Performance Materials and Dynasylan® 4144 manufactured by Evonik/Degussa.

The amount of dispersant used in the metal oxide dispersion may vary from about 1% by weight to about 300% by weight of the metal oxide particles content. In some examples, the dispersant content range is between about 2 to about 150% by weight of the metal oxide particles content. In some other examples, the dispersant content range is between about 5 to about 100% by weight of the metal oxide particles content. The dispersion of metal oxide particles can be prepared via milling or dispersing metal oxide powder in water in the presence of suitable dispersants.

The metal oxide dispersion may be prepared by milling commercially available inorganic oxide pigment having large particle size (in the micron range) in the presence of the dispersants described above until the desired particle size is achieved. The starting dispersion to be milled can be an aqueous dispersion with a solids content up to 40% by weight of the metal oxide pigment. The milling equipment that can be used is a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired. In one example, commercially available colloidal metal oxide dispersions of particle sizes from 10 to 50 nm, such as silica and alumina, can be received from companies such as Nissan Chemical American Corporation and US Research Nanomaterials, Inc, among others.

Generally, the ink and resultant structured network comprises a salt. In one example, the salt can be an organic salt (e.g. tetraethyl ammonium, tetramethyl ammonium, acetate salts, etc.). In another aspect, the salt can include salts of carboxylic acids (e.g. sodium or potassium 2-pyrrolidinone-5-carboxylic acid), sodium or potassium acetate, salts of citric acid or any organic acid including aromatic salts, and mixtures thereof. In another example, the salt can be an inorganic salt (e.g., sodium nitrate). In one aspect, the salt can be a monovalent salt. Such monovalent salts can include sodium, lithium, potassium cations and nitrate, chloride, acetate anions, and mixtures thereof. In another aspect, the salt can be multivalent, e.g. divalent, and can include calcium nitrate, magnesium nitrate, and mixtures thereof.

As discussed herein, the salt can generally be present in the non-Newtonian inkjet ink in an amount ranging from 0.05% to 20% by weight based on the total weight of the non-Newtonian inkjet ink. In one example, the salt can be present in an amount of 1% to 10% by weight, and in some aspects, 0.5% to 4%, 0.5% to 3%, or 1% to 2%, by weight, based on the total weight of the non-Newtonian inkjet ink. It is noted that the salts used with each type of gelator (e.g. metal oxide or low molecular weight organic gelator) can be distinct, e.g., an inorganic and organic salt. However, in one example, the salts can be the same. As such, each type of gelator can be used with any type of salt as discussed herein.

The inclusion of a salt, particularly a dissolved salt in gelator ink, can contribute to the structure of the ink. In the case of metal oxide gelators, a salt can act to shield the electrostatic repulsion between particles and permit the van der Waals interactions to increase, thereby forming a stronger attractive potential and resulting in a structured network by providing elastic content to a predominantly fluidic system. As mentioned, these structured systems show non-Newtonian flow behavior, thus providing useful characteristics for implementation in an ink-jet ink because their ability to shear or thermal thin for jetting. Once jetted, this feature allows the jetted drops to become more elastic-, mass-, or gel-like when they strike the media surface. These characteristics can also provide improved media attributes such as colorant holdout on the surface.

Regarding the inks of the present disclosure (with or without colorant), the role of salt can impact both the jettability and the response after jetting. When comparing two gelator inkjet ink (with or without salt, but otherwise identical), the ink with salt will typically have a lower viscosity over a range of shear rates. In one example, the salt can be added such that its presence in this system is just enough to make an appreciable difference in the printing characteristics of the ink, but not so much that the ink becomes too low in viscosity. This amount can be determined by routine experimentation. For example, the salted gelator ink can be designed so that the ink can refill quickly and produce a higher quality print. Higher quality printing can be determined in one aspect by improved optical density (when a colorant is present in the ink). Typically, inks with salt can have higher optical densities, while retaining good jettability properties and other properties, such as ink structure, rheological behavior, shear thinning, and jetting of ink drops. Furthermore, salt can also contribute to the gelator inks of the present disclosure having decreased restructuring time after shear or thermal thinning for printing. Higher pre-shear rates can often result in a likewise faster response in the presence of salt. In these instances, a fast restructuring of the ink can mean more solid-like behavior on the media surface in less time with less fluid penetration, and thus better colorant holdout and greater ink efficiency.

The properties of the structured network, e.g., viscosity, gel strength, conductivity, particle size, etc. and the page attributes, optical density, ink efficiency, media independence, etc., can be affected by a number of variables including the type of low molecular weight organic gelator or metal oxide, the type of salt, the type of solvents, the amounts of these components, pH, ionic strength, etc. Regarding viscosity, as discussed herein, the viscosity for non-Newtonian fluids are not discrete but change based on the thermal or mechanical energy applied to the fluid. As used herein, "viscosity" refers to dynamic viscosity unless otherwise stated. For the present inks, the viscosity can generally be measured at two states: proximate to an at rest state; i.e., at room temperature (23° C.) or at a low shear rate ($5\ s^{-1}$), and proximate to a processing state; i.e., at an elevated temperature (e.g. 50° C.) or at a high shear rate ($10,000\ s^{-1}$). In one example, the present inks can have a dynamic viscosity ranging from 100 cps to 10,000 cps at rest and a dynamic viscosity ranging from 1 cps to 25 cps at a processing state. In one example, the dynamic viscosity can be 100 cps to 1000 cps at a rest state and can be 1 cps to 15 cps at a processing state.

Additionally, the gelator and the salt can be present in the ink at a ratio that allows for formation of the structured network. In one example, the low molecular weight organic gelator and the salt can be present at a low molecular weight organic gelator to salt ratio ranging from 1:1 to 1:5 by weight. In one aspect, the ratio can be from 0.5:1 to 2:1. In another example, the metal oxide and the salt can be present at a metal oxide to salt ratio ranging from 0.5:1 to 5:1 by weight. In one aspect, the ratio can be from 2:1 to 3:1.

Generally, the present structured network is formed in an organic solvent. As used herein, "organic solvent" refers to any organic solvent or mixture thereof. As such, the term organic solvent includes systems of solvents. The present organic solvents are in addition to any water present in the non-Newtonian inkjet ink. Typical organic solvents that can be used include methanol, ethanol, propanol, iso-propanol, a glycol ether having at least about four carbon atoms, C4-8 alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-Bis(2-Hydroxyethyl)-5,5-Dimethylhydantoin (Dantocol® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the non-Newtonian inkjet ink, typically measured at any temperature functional. As used herein, "network non-participating solvent" refers to organic solvents that decrease the viscosity of the non-Newtonian inkjet ink, measured at any functional temperature. As such, the present non-Newtonian inkjet inks can be altered based on the types of organic solvents used. For example, when the non-Newtonian inkjet ink comprises a network participating solvent, the structured network can be strengthened, e.g., the viscosity of the non-Newtonian inkjet ink can be increased. However, when a network non-participating solvent is used, the structured network can be weakened, e.g., the viscosity of the non-Newtonian inkjet ink can be decreased. In one example, network participating solvents can include ethylhydroxypropanediol (EHPD), glycerol, 1,5 pentanediol, ethylene glycol, triethylene glycol, and mixtures thereof. In another example, network non-participating solvents can include 2-pyrrolidinone, 1,2 pentanediol, MPDIOL, 1,2 hexanediol, and mixtures thereof. As such, the structured network properties, and resultant non-Newtonian inkjet ink properties, can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In one example, the organic solvent can be present in an amount ranging from 5% to 50% by weight based on the total weight of the non-Newtonian inkjet ink. In one aspect, the organic solvent can be present in an amount ranging from 10% to 40%, or even, 15% to 30% by weight.

Generally, the present non-Newtonian inkjet inks also include a sugar alcohol. The sugar alcohol can be any type of chain or cyclic sugar alcohol. In one example, the sugar alcohol can have the formula: $H(HCHO)_{n+1}H$ where n is at least 3. Such sugar alcohols can include without limitation erythritol (4-carbon), threitol (4-carbon), arabitol (5-carbon), xylitol (5-carbon), ribitol (5-carbon), mannitol (6-carbon), sorbitol (6-carbon), galactitol (6-carbon), fucitol (6-carbon), iditol (6-carbon), inositol (6-carbon; a cyclic sugar alcohol), volemitol (7-carbon), isomalt (12-carbon), maltitol (12-carbon), lactitol (12-carbon), and mixtures thereof. In one example, the sugar alcohol can be a 5 carbon sugar alcohol. In another example, the sugar alcohol can be a 6 carbon sugar alcohol. Generally, the sugar alcohol is present in the non-Newtonian inkjet ink in an amount ranging from 1% to 25% by weight based on the total weight of the non-Newtonian inkjet ink. In one example, the sugar alcohol can be present in an amount ranging from 2.5% to 25% by weight, or from 7.5% to 15% by weight.

In accordance with this, in one example, the optical density of the non-Newtonian inkjet ink can be increased by at least 5% over a comparative inkjet ink printed from the same inkjet printer on the same recording media with the same print coverage. In other aspects, the optical density can be increased by 10%, 15%, 20%, or 30%. Such recording media can include both coated and uncoated recording media. As used herein, "comparative inkjet ink" refers to an aqueous Newtonian inkjet ink such as commercially available HP®970 Black ink cartridge. It is noted that the OD improvement can be attributed in part to the enhanced binding properties between the pigment and the media surface using the sorbitol or other similar compounds as described herein.

Furthermore, particularly the use of a sugar alcohol can provide excellent curl and rub/scratch resistance over a comparative non-Newtonian inkjet ink. As used herein, "comparative non-Newtonian inkjet ink" refers to the present non-Newtonian inkjet ink without the sugar alcohol. As such, in one example, the comparative non-Newtonian inkjet ink can have the exact same composition of the present non-Newtonian inkjet ink except that instead of the sugar alcohol, the comparative non-Newtonian inkjet ink contains additional water or organic solvent, whichever is the predominant solvent.

In further detail regarding the use of sugar alcohols, such as sorbitol, in one example, the sugar alcohol content can be relatively high without introducing jettability problems into the non-Newtonian inks. For example, as mentioned, the sugar alcohol can be included at 1% by weight to 25% by weight, and even when used above 5% by weight, e.g., 7.5% to 15% by weight, this concentration of sugar alcohol content is not problematic regarding printability. On the other hand, adding this much sugar alcohol can increase the viscosity of Newtonian inks about 2 cps (assuming similar type solvents), making the fluidics more challenging. However, in non-Newtonian system such as those of the present technology, this is less of an issue as these additives relates favorably to desirable rheology properties of the inks. Additionally, with these additives, the degree of hydrogen bonding can also contribute to support the network, much in the same way that network participating solvents contribute to supporting the network as described previously. Furthermore, rub/scratch resistance of the ink to the media surface can be enhanced in examples where a colorant is used, thus assisting with the binding of the colorant to the media surface. Thus, the present inks can be used effectively to bind colorant to the media surface, even without the presence of an added polymeric binder.

In accordance with the present disclosure, curl and rub resistance can be objectively measured. In one example, curl can be measured by determining the height of the printed sheet above a horizontal support on which the media sheet rests, such as a tabletop. This is measured as a function of time. Rub resistance, on the other hand, can be measured by using a tool that can scratch or rub across the printed sheeted with a pre-determined amount of pressure. In this case, a circular scratch nip of ~1 mm in diameter made of hardwood and with applied mass of 50, 250 and 500 grams can be used.

As discussed herein, the present inks can include a colorant. Such colorants can include pigments and/or dyes. In one example, the colorant is a pigment, and in one aspect, a dispersed pigment. In another example, the colorant can be a dye. In yet another example, the colorant can be a mixture of a pigment and a dye.

The present inks can be used in conjunction with multiple imaging systems, non-limiting examples of which include thermal or piezo inkjet, dye-sub, thermal transfer, electrostatic, liquid electrophotographic printing (LEP), etc. Additionally, the present inks can include water, and can further include non-ionic, cationic, and/or anionic surfactants, ranging from 0.001% to 10% by weight. The present formulations can include other components, such as biocides, viscosity modifiers, materials for pH adjustment, sequestering agents, preservatives, and the like.

Figure 1:
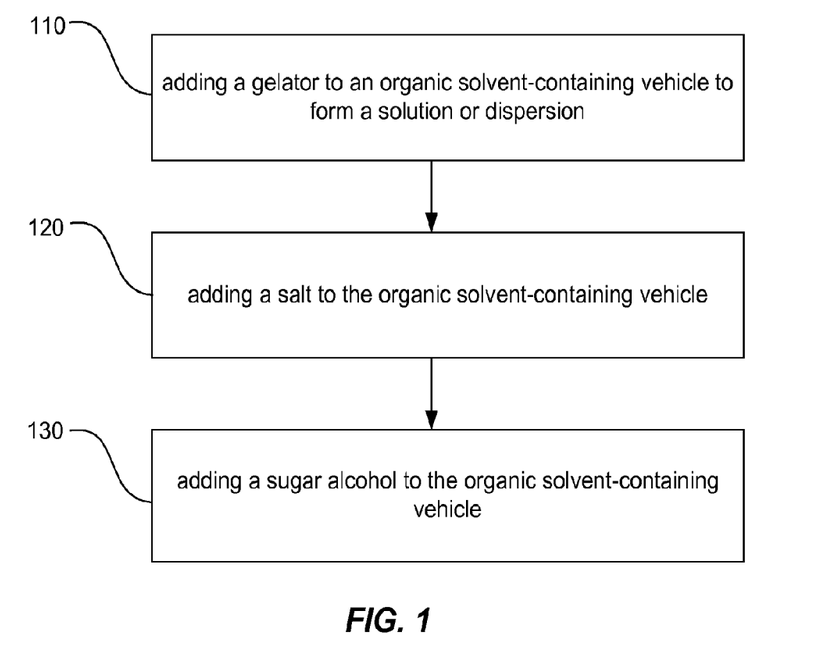
FIG. 1 is a flow chart of a method in accordance with an example of the present disclosure.

In addition to the non-Newtonian inkjet inks described herein, the present disclosure provides for methods relating thereto. Turning now to FIG. 1, a method of manufacturing a non-Newtonian inkjet ink can comprise adding 110 a gelator to an organic solvent-containing vehicle to form a solution or dispersion; adding 120 a salt to the organic solvent-containing vehicle; and adding 130 a sugar alcohol to the organic solvent-containing vehicle. The gelator, the salt, and organic solvent can be in the organic solvent-containing vehicle in amounts sufficient to form a structured network, as well as provide a dynamic viscosity ranging from 25 cps to 10,000 cps at a first state and a second dynamic viscosity ranging from 1 cps to 50 cps at a second state. The organic solvent-containing vehicle can include the organic solvents described herein (network participating and/or non-network participating), and in some examples, include water, e.g., aqueous systems. The gelator, salt, and sugar alcohol can be added together or in any order. Heating steps can be used to dissolve or disperse ingredients as needed. The present method can further comprise mixing a colorant into the non-Newtonian inkjet inks. In one example, the colorant can be a pigment. As discussed herein, such pigments can be self-dispersed or can further include dispersants, e.g., a polymer dispersant. In another example, the colorant can be a dye, or a mixture of pigment and dye.

Regarding the present method steps, such steps can be performed in a number of sequences and are not intended to be limited to the order written. For example, the adding of the gelator can be before adding the salt, and vice versa. Additionally, it is noted that any and all combinations of such steps or individual step may be performed sequentially or simultaneously. For example, adding the gelator and adding the sugar alcohol may be performed sequentially or may be performed simultaneously.

Figure 2:
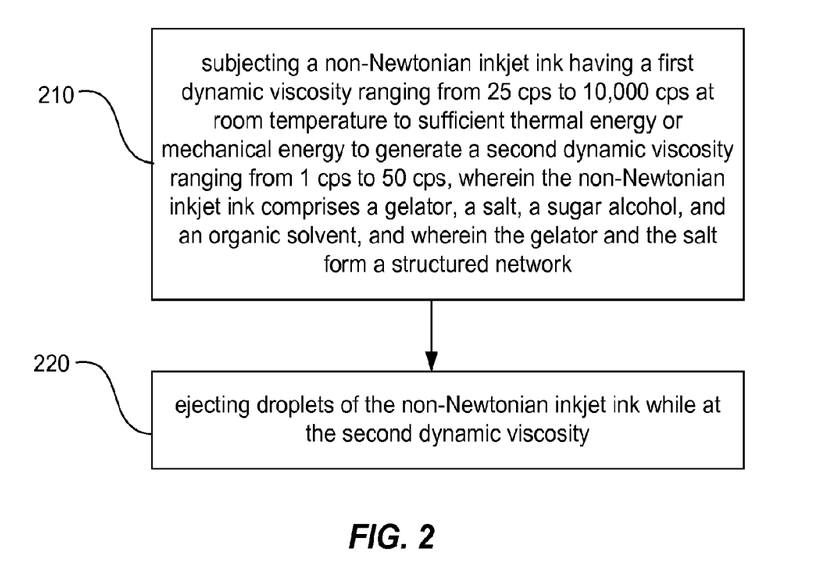
FIG. 2 is a flow chart of another method in accordance with an example of the present disclosure.

Turning now to FIG. 2, a method of printing a non-Newtonian inkjet ink can comprise subjecting 210 a non-Newtonian inkjet ink having a first dynamic viscosity ranging from 25 cps to 10,000 cps at room temperature to sufficient thermal energy or mechanical energy to generate a second dynamic viscosity ranging from 1 cps to 50 cps. The non-Newtonian inkjet ink can comprise a gelator, a salt, a sugar alcohol, and an organic solvent. Also, the gelator and the salt can form a structured network, e.g., in the inkjet pen, or on the media substrate. Shear or thermal thinning can occur to jet the ink from the inkjet architecture in one example. An additional step includes ejecting 220 droplets of the non-Newtonian inkjet ink while at the second dynamic viscosity. The steps of subjecting and ejecting can be carried out sequentially or simultaneously.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following examples illustrate some embodiments of the present inks and methods that are presently known. However, it is to be understood that the following are only exemplary or illustrative of the application of the principles of the present inks and methods. Numerous modifications and alternative examples may be devised by those skilled in the art without departing from the spirit and scope of the present compositions and methods. The appended claims are intended to cover such modifications and arrangements. Thus, while the present inks and methods have been described above with particularity, the following examples provide further detail in connection with what are presently deemed to be the acceptable embodiments.

Example 1—Non-Newtonian Inkjet Inks

Two non-Newtonian inkjet inks were prepared with the components and the amounts listed in Table 1. Ink 1 contains the anti-curl compound sorbitol and Ink 2, although still non-Newtonian in nature, does not contain the sorbitol.

TABLE 1

| Components | Ink 1 (wt %) | Ink 2 (wt %) |
|---|---|---|
| Silica dispersion (ST-30LH)* | 4 | 4 |
| sodium nitrate | 1.5 | — |
| sorbitol | 10 | — |
| (organic solvent) | 20 | 20 |
| Carbon Black dispersion** | 3.5 | 3.5 |
| Water | Balance | Balance |
| Viscosity at 133 s$^{-1}$ (cps) at 25° C. | 32.1 | 25.5 |
| Viscosity at 10,667 s$^{-1}$ (cps) at 25° C. | 5.5 | 2.2 |

*As obtained from Nissan Chemical Company (wt % by silica content in Ink)
**As obtained from Cabot Chemical Inc as 300 Series K Example 2—Curl Resistance The inks of Example 1 were printed on a Hewlett Packard testbed at a coverage of 20% print density on various media and tested for curl. Curl was determined by the height of the paper at the four corners from the horizontal base after a prescribed period of time after printing. The higher the numbers as measured in mm represent greater amounts of curl. In the Tables below, the average height increase at the four corners of the sheet on media printed with a gap and no gap between swaths is reported. The gap is ⅛" between swaths. Swaths are ⅞×8".

Figure 3:
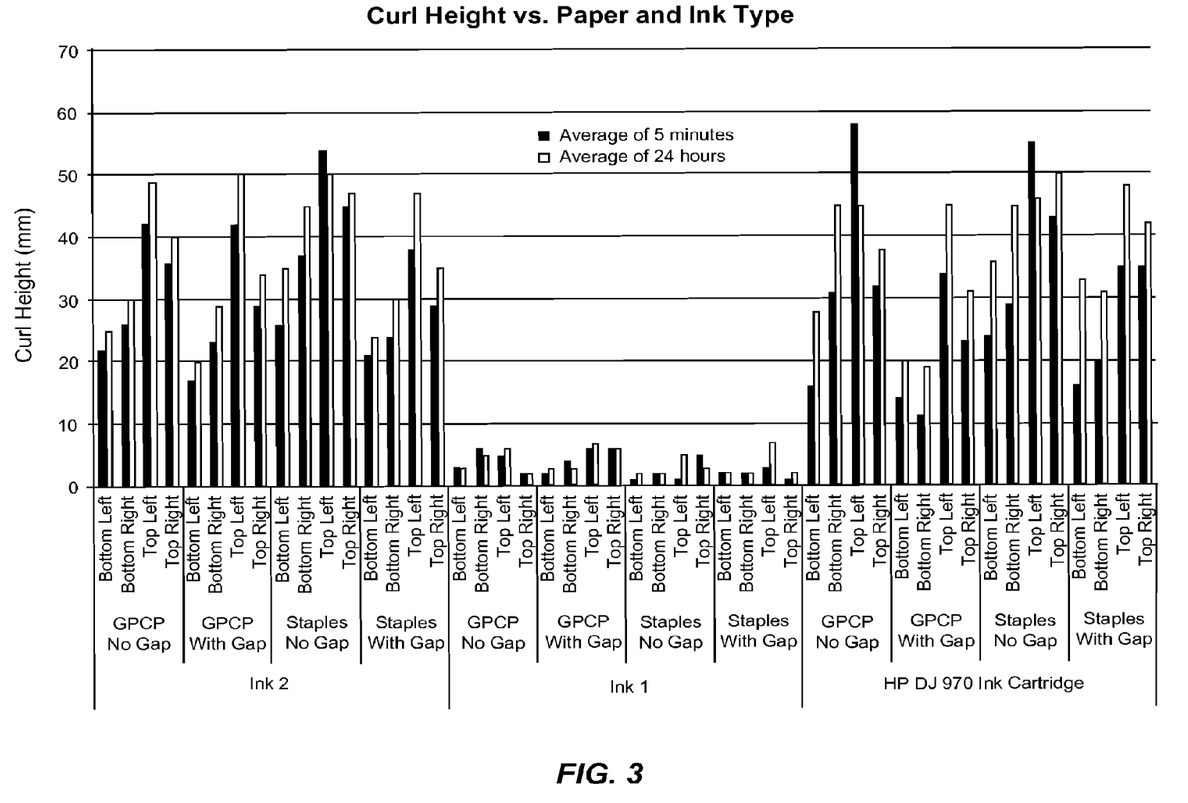
FIG. 3 is a bar graph depicting curl measurements in accordance with an example of the present disclosure.

As can be seen in Tables 2-4 and FIG. 3, the amount of curl is significantly less when the sorbitol is present compared to a formulation without, and as compared to a commercially available Newtonian formulation using the ink from the HP DJ970 cartridge, commercially available from the Hewlett-Packard Company. The amount of curl rises fast during the first five minutes then starts to level off after 24 hours. Over longer periods of time, Ink 2 remains relatively flat at the 24 hour numbers but the other inks can actually increase to the point of forming a rolled sheet of paper. The latter effect is dependent on paper type and print density, but with sorbitol present, the curl does not appreciably occur regardless of paper and density. Additionally, as mentioned, a control ink was printed for comparison, HP DJ970 Black Ink Cartridge commercially available from Hewlett Packard. As shown in Tables 2-4 and FIG. 3, the present inks had significantly less curl as compared to the comparative inks.

TABLE 2

Ink 1

| Paper and Location | At 5 minutes (mm) | At 24 hours (mm) |
|---|---|---|
| GPCP no gap | | |
| Bottom Left | 3 | 3 |
| Bottom Right | 6 | 5 |
| Top Left | 5 | 6 |
| Top Right | 2 | 2 |
| GPCP with gap | | |
| Bottom Left | 2 | 3 |
| Bottom Right | 4 | 3 |
| Top Left | 6 | 7 |
| Top Right | 6 | 6 |
| Staples Copy no gap | | |
| Bottom Left | 1 | 2 |
| Bottom Right | 2 | 2 |
| Top Left | 1 | 5 |
| Top Right | 5 | 3 |
| Staples Copy with gap | | |
| Bottom Left | 2 | 2 |
| Bottom Right | 2 | 2 |
| Top Left | 3 | 7 |
| Top Right | 1 | 2 |

STAPLES—Staples Copy Paper (Made for Staples)
GPCP—GEORGIA PACIFIC COPY PAPER (Georgia Pacific)
Gap refers to a space of 1/8" between swaths of 7/8 × 8"

TABLE 3

Ink 2

| Paper and Location | At 5 minutes (mm) | At 24 hours (mm) |
|---|---|---|
| GPCP no gap | | |
| Bottom Left | 22 | 25 |
| Bottom Right | 26 | 30 |
| Top Left | 42 | 49 |
| Top Right | 36 | 40 |
| GPCP with gap | | |
| Bottom Left | 17 | 20 |
| Bottom Right | 23 | 29 |
| Top Left | 42 | 50 |
| Top Right | 29 | 34 |
| Staples Copy no gap | | |
| Bottom Left | 26 | 35 |
| Bottom Right | 37 | 45 |
| Top Left | 54 | 50 |
| Top Right | 45 | 47 |

TABLE 3-continued

Ink 2

| Paper and Location | At 5 minutes (mm) | At 24 hours (mm) |
|---|---|---|
| Staples Copy with gap | | |
| Bottom Left | 21 | 24 |
| Bottom Right | 24 | 30 |
| Top Left | 38 | 47 |
| Top Right | 29 | 35 |

STAPLES—Staples Copy Paper (Made for Staples)
GPCP—GEORGIA PACIFIC COPY PAPER (Georgia Pacific)
Gap refers to a space of 1/8" between swaths of 7/8 × 8"

TABLE 4

Comparative Ink (HP DJ970 Ink cartridge)

| Paper and Location | At 5 minutes (mm) | At 24 hours (mm) |
|---|---|---|
| GPCP no gap | | |
| Bottom Left | 16 | 28 |
| Bottom Right | 31 | 45 |
| Top Left | 58 | 45 |
| Top Right | 32 | 38 |
| GPCP with gap | | |
| Bottom Left | 14 | 20 |
| Bottom Right | 11 | 19 |
| Top Left | 34 | 45 |
| Top Right | 23 | 31 |
| Staples Copy no gap | | |
| Bottom Left | 24 | 36 |
| Bottom Right | 29 | 45 |
| Top Left | 55 | 46 |
| Top Right | 43 | 50 |
| Staples Copy with gap | | |
| Bottom Left | 16 | 33 |
| Bottom Right | 20 | 31 |
| Top Left | 35 | 48 |
| Top Right | 35 | 42 |

STAPLES—Staples Copy Paper (Made for Staples)
GPCP—GEORGIA PACIFIC COPY PAPER (Georgia Pacific)
Gap refers to a space of 1/8" between swaths of 7/8 × 8"

Example 3—Scratch Testing

Figure 4:
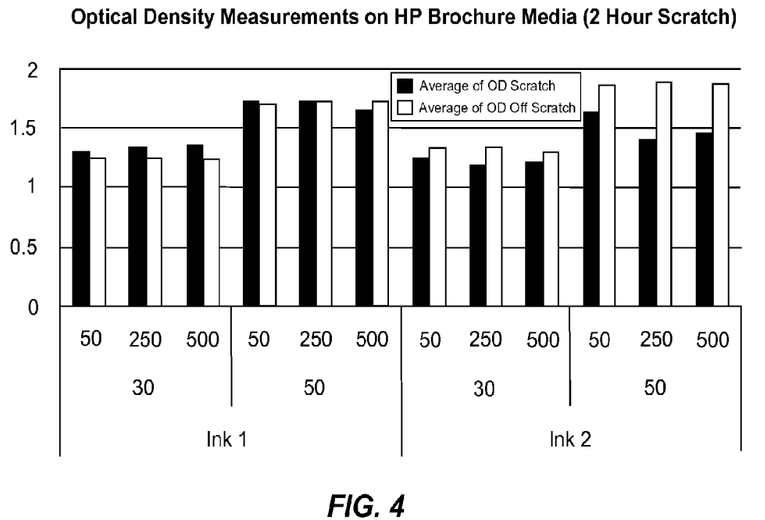
FIG. 4 is a bar graph depicting optical density (OD) measurements at 2 hours for scratch resistance in accordance with an example of the present disclosure.
Figure 5:
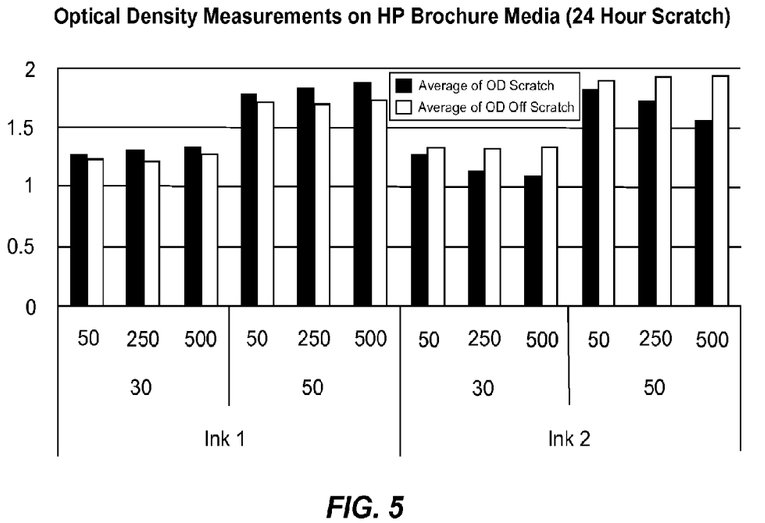
FIG. 5 is a bar graph depicting optical density (OD) measurements at 24 hours for scratch resistance in accordance with an example of the present disclosure.

Scratch was measured for the present and comparative inks according to Tables 5-6 and FIG. 4 (2 hours) and according to Tables 7-8 and FIG. 5 (24 hours).

TABLE 5

Ink 1

| Ink 1 (% = print density) (g = weight applied to scratch nib) | OD Scratch | OD Off Scratch |
|---|---|---|
| 30% | | |
| 50 g | 1.3 | 1.25 |
| 250 g | 1.34 | 1.25 |
| 500 g | 1.36 | 1.24 |
| 50% | | |
| 50 g | 1.73 | 1.71 |
| 250 g | 1.73 | 1.73 |
| 500 g | 1.65 | 1.73 |

TABLE 6

Ink 2

| Ink 2<br>(% = print density)<br>(g = weight applied<br>to scratch nib) | OD Scratch | OD Off Scratch |
|---|---|---|
| 30% | | |
| 50 g | 1.25 | 1.35 |
| 250 g | 1.19 | 1.34 |
| 500 g | 1.22 | 1.31 |
| 50% | | |
| 50 g | 1.64 | 1.87 |
| 250 g | 1.41 | 1.9 |
| 500 g | 1.46 | 1.87 |

TABLE 7

Ink 1

| Ink 1<br>(% = print density)<br>(g = weight applied<br>to scratch nib) | OD Scratch | OD Off Scratch |
|---|---|---|
| 30% | | |
| 50 g | 1.27 | 1.23 |
| 250 g | 1.31 | 1.22 |
| 500 g | 1.34 | 1.27 |
| 50% | | |
| 50 | 1.77 | 1.71 |
| 250 | 1.82 | 1.7 |
| 500 | 1.86 | 1.72 |

TABLE 8

Ink 2

| Ink 2<br>(% = print density)<br>(g = amount applied<br>to scratch nib) | OD Scratch | OD Off Scratch |
|---|---|---|
| 30% | | |
| 50 g | 1.26 | 1.33 |
| 250 g | 1.14 | 1.32 |
| 500 g | 1.09 | 1.33 |
| 50% | | |
| 50 g | 1.81 | 1.88 |
| 250 g | 1.72 | 1.91 |
| 500 g | 1.55 | 1.92 |

As can be seen in Tables 5-6, the amount of ink that is removed based on optical density measurements is greater after the scratch test with Ink 2 compared to Ink 1. The difference in optical densities relates to the amount of darkness where the media was scratched compared to where it was left untouched. As much as 25% of the ink was removed from Ink 1 after scratching as compared to near 0% for Ink 1. For Ink 1, there is actually may be observed some slight increases in OD after the scratch. This is due to small spreading or smudging of ink by the test tool.

Similar results were obtained after 24 hours scratch testing between Ink 1 and Ink 2 as shown in Tables 7-8 where as much of 20% of the ink was removed in Ink 2 as compared to Ink 1.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A non-Newtonian inkjet ink, comprising:
   a gelator in an amount ranging from 0.1% to 10% by weight based on the total weight of the non-Newtonian inkjet ink;
   a salt in an amount of 0.05% to 20% by weight based on the total weight of the non-Newtonian inkjet ink;
   a sugar alcohol in an amount of 1% to 25% by weight based on the total weight of the non-Newtonian inkjet ink; and
   an organic solvent;
   wherein the gelator and the salt form a structured network, and wherein the inkjet ink has a first dynamic viscosity ranging from 25 cps to 10,000 cps at a first state and a second dynamic viscosity ranging from 1 cps to 50 cps at a second state.

2. The non-Newtonian inkjet ink of claim 1, wherein the first dynamic viscosity is 100 cps to 1000 cps at the first state and the second dynamic viscosity is 1 cps to 25 cps at the second state.

3. The non-Newtonian inkjet ink of claim 1, wherein
   the gelator is a low molecular weight organic gelator and the first state and the second state correlate to a first temperature of 25° C. and a second temperature of 50° C., respectively, of the non-Newtonian inkjet ink; or
   the gelator is a metal oxide and the first state and the second state correlate to a first shear rate of 5 s$^{-1}$ and a second shear rate of 10,000 s$^{-1}$, respectively, placed on the non-Newtonian inkjet ink.

4. The non-Newtonian inkjet ink of claim 1, wherein:
   the gelator is i) a low molecular weight organic gelator selected from the group consisting of amino acids, peptides, cyclic peptides, amino acids having a protecting group, peptides having a protecting group, and cyclic peptides having a protecting group; or ii) a metal oxide selected from the group consisting of aluminum oxide, silicon dioxide, zinc oxide, iron oxide, titanium dioxide, indium oxide, and zirconium oxide;
   the salt includes i) a carboxylic acid, or ii) a cation selected from the group consisting of sodium, lithium, potassium, magnesium, and calcium; and an anion selected from the group consisting of nitrate, chloride, sulfate, and acetate; and
   the sugar alcohol is selected from the group consisting of erythritol, threitol, arabitol, xylitol, ribitol, mannitol, sorbitol, galactitol, fucitol, iditol, inositol, volemitol, isomalt, maltitol, lactitol, and mixtures thereof.

5. The non-Newtonian inkjet ink of claim 1, wherein the structured network is free of polymer.

6. The non-Newtonian inkjet ink of claim 1, wherein the organic solvent is network participating solvent selected from the group consisting of ethylhydroxy-propanediol (EHPD), glycerol, 1,5 pentanediol, ethylene glycol, triethylene glycol, and mixtures thereof or the organic solvent is a network non-participating solvent selected from the group consisting of 2-pyrrolidinone, 1,2 pentanediol, 2-methyl-1, 3-propanediol (MPDIOL), 1,2 hexanediol, and mixtures thereof.

7. The non-Newtonian inkjet ink of claim 1, wherein the organic solvent comprises only a network participating solvent, or a mixture of network participating solvent and a network non-participating solvent.

8. The non-Newtonian inkjet ink of claim 1, wherein the gelator is a low molecular weight organic gelator and is present in an amount ranging from 1% to 5% by weight based on the total weight of the non-Newtonian inkjet ink, the sugar alcohol is present in an amount ranging from 10% to 20% by weight based on the total weight of the non-Newtonian inkjet ink, and the salt is present in an amount ranging from 1% to 10% by weight based on the total weight of the non-Newtonian inkjet ink.

9. The non-Newtonian inkjet ink of claim 1, wherein the gelator is a metal oxide present in an amount ranging from 1% to 5% by weight based on the total weight of the non-Newtonian inkjet ink, the sugar alcohol is present in an amount ranging from 10% to 20% by weight based on the total weight of the non-Newtonian inkjet ink, and the salt is present in an amount ranging from 0.5% to 4% by weight based on the total weight of the non-Newtonian inkjet ink.

10. The non-Newtonian inkjet ink of claim 1, wherein the gelator is:
    i) a low molecular weight organic gelator, and the low molecular weight organic gelator and the salt are present in the non-Newtonian inkjet ink at a low molecular weight organic gelator to salt ratio ranging from 1:1 to 1:5 by weight; or
    ii) a metal oxide, and the metal oxide and the salt are present in the non-Newtonian inkjet ink at a metal oxide to salt ratio ranging from 1:1 to 5:1 by weight.

11. The non-Newtonian inkjet ink of claim 1, further comprising a colorant.

12. A method of manufacturing a non-Newtonian inkjet ink, comprising:
    adding a gelator to an organic solvent-containing vehicle to form a solution or dispersion;
    adding a salt to the organic solvent-containing vehicle; and
    adding a sugar alcohol to the organic solvent-containing vehicle,
    wherein the gelator, the salt, and organic solvent present in the organic solvent-containing vehicle are present in amounts sufficient to form a structured network and provide a dynamic viscosity ranging from 25 cps to 10,000 cps at a first state and a second dynamic viscosity ranging from 1 cps to 50 cps at a second state.

13. The method of claim 12, wherein the gelator is present in an amount ranging from 0.1% to 10% by weight based on the total weight of the non-Newtonian inkjet ink; the salt is present in an amount of 0.05% to 20% by weight based on the total weight of the non-Newtonian inkjet ink; the sugar alcohol is present in an amount of 1% to 25% by weight based on the total weight of the non-Newtonian inkjet ink; and the organic solvent is present in an amount ranging from 10% to 40% by weight based on the total weight of the non-Newtonian inkjet ink.

14. The method of claim 12, further comprising mixing a colorant into the non-Newtonian inkjet ink.

15. A method of printing a non-Newtonian inkjet ink, comprising:
    subjecting a non-Newtonian inkjet ink having a first dynamic viscosity ranging from 25 cps to 10,000 cps at room temperature to thermal energy or mechanical energy to generate a second dynamic viscosity ranging from 1 cps to 50 cps, wherein the non-Newtonian inkjet ink comprises a gelator, a salt, a sugar alcohol, and an organic solvent, and wherein the gelator and the salt form a structured network; and
    ejecting droplets of the non-Newtonian inkjet ink while at the second dynamic viscosity.

\* \* \* \* \*

UNITED STATES PATENT AND TRADEMARK OFFICE
CERTIFICATE OF CORRECTION

PATENT NO. : 9,732,246 B2
APPLICATION NO. : 15/119063
DATED : August 15, 2017
INVENTOR(S) : Raymond Adamic Page 1 of 1

It is certified that error appears in the above-identified patent and that said Letters Patent is hereby corrected as shown below:

On the Title Page

Item (12) should read --Adamic--

Item (72) "Raymond Adamic, Jr." should read --Raymond Adamic--

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*